United States Patent [19]

Muramatsu et al.

[11] Patent Number: 5,215,294
[45] Date of Patent: Jun. 1, 1993

[54] FLUID-FILLED ELASTIC MOUNT HAVING AIR CHAMBER FOR ABSORBING PRESSURE CHANGE IN FLUID CHAMBER FILLED WITH HIGHLY VISCOUS FLUID

[75] Inventors: Atsushi Muramatsu, Komaki; Akiyoshi Ide, Inuyama; Masayuki Hibi, Komaki, all of Japan

[73] Assignee: Tokai Rubber Industries, Ltd., Japan

[21] Appl. No.: 759,523

[22] Filed: Sep. 13, 1991

[30] Foreign Application Priority Data

Sep. 18, 1990 [JP] Japan .................... 2-248335

[51] Int. Cl.⁵ .............................................. F16F 15/04
[52] U.S. Cl. ................................ 267/140.13; 267/219
[58] Field of Search ............... 267/140.1 A, 140.1 R, 267/140.1 AE, 219; 248/562, 566, 550; 180/300, 312

[56] References Cited

U.S. PATENT DOCUMENTS

| | | | |
|---|---|---|---|
| 4,667,749 | 5/1987 | Keller | 267/140.1 A |
| 4,757,982 | 7/1988 | Andvä et al. | 267/140.1 A |
| 4,770,396 | 9/1988 | Jouade | 248/562 |
| 4,826,126 | 5/1989 | Katayama et al. | 267/140.1 A |
| 4,828,234 | 5/1989 | Hoying et al. | 248/550 |
| 4,840,358 | 6/1989 | Hoying et al. | 248/566 |
| 4,869,474 | 9/1989 | Best et al. | 267/136 |
| 4,869,477 | 9/1989 | Hoying et al. | 267/218 |
| 4,901,986 | 2/1990 | Smith | 248/562 |

FOREIGN PATENT DOCUMENTS

62-288742 12/1987 Japan .

Primary Examiner—Robert J. Oberleitner
Assistant Examiner—Chris Schwartz
Attorney, Agent, or Firm—Parkhurst, Wendel & Rossi

[57] ABSTRACT

A fluid-filled elastic mount having a main fluid chamber partially defined by an elastic body between first and second structures, a variable-volume chamber communicating with the main fluid chamber through a passage, and an air chamber at least partially defined by a flexible diaphragm partially defining the main fluid chamber. The main fluid chamber has a flow-restricting portion partially defined by a flow-restricting member disposed in the main fluid chamber. A pressure in the air chamber adjacent to the main fluid chamber is controlled by the pressure control device.

8 Claims, 4 Drawing Sheets

FLUID-FILLED ELASTIC MOUNT HAVING AIR CHAMBER FOR ABSORBING PRESSURE CHANGE IN FLUID CHAMBER FILLED WITH HIGHLY VISCOUS FLUID

BACKGROUND OF THE INVENTION

1. Field of the Invention

The present invention relates in general to a fluid-filled elastic mount which is filled with a highly viscous fluid and which is adapted to damp vibrations based on flow of the highly viscous fluid herein. More particularly, the present invention is concerned with such a fluid-filled elastic mount which is capable of exhibiting different vibration damping or isolating characteristics depending upon the type of the vibrations applied thereto.

2. Discussion of the Prior Art

An elastic mount is known as a vibration damping device interposed between two members of a vibration system, for flexibly connecting these two members. The elastic mount includes a first and a second support structure which are spaced apart from each other in a load-receiving direction and are elastically connected to each other by an elastic body interposed therebetween. The elastic mount of this type is suitably used as an engine mount or a differential gear mount for an automobile, for example.

The known elastic mount constructed a described above relies solely on the elasticity of the elastic body to damp or isolate input vibrations. With recent increasing requirements for anti-noise, anti-vibration capability and improved stability and controllability by an automobile, the known elastic mount is becoming unsatisfactory in its vibration damping or isolating characteristics. In view of this situation, it is proposed to fill a space in the elastic mount with a suitable fluid to provide a so-called fluid-filled elastic mount, so as to achieve improved vibration damping or isolating capability.

The applicants of the present invention proposed one type of such a fluid-filled elastic mount as disclosed in laid-open Publication No. 62-288742 of unexamined Japanese Patent Application. The elastic mount disclosed in this publication has a fluid chamber formed between the first and second support structures which are connected by the elastic body. The fluid chamber is filled with a highly viscous fluid having a relatively high kinematic viscosity. In the fluid chamber, there is formed a flow-restricting portion having suitable dimensions, such that shearing stresses are applied to the mass of the highly viscous fluid which exists in the flow-restricting portion upon application of a vibrational load.

The thus constructed elastic mount is capable of providing a sufficiently high damping coefficient for effectively damping vibrations such as shakes or bounce, based on shearing strains of the highly viscous fluid which take place upon application of such vibrations.

Further study and analysis of the inventors on the fluid-filled elastic mount as described above revealed that the dynamic spring constant of the elastic mount tends to increase due to a pressure rise in the fluid chamber which occurs upon application of the vibrations. In particular, as the frequency of the input vibrations becomes higher, the phase difference between the vibrations applied to the mount and the vibrations transmitted from the mount is increased, to accordingly increase the degree of the pressure rise within the fluid chamber (i.e., pressure rise of the viscous fluid). Consequently, the elastic mount unfavorably exhibits an excessively increased dynamic spring constant with respect to high-frequency vibrations to be isolated by the mount, resulting in deterioration in its vibration isolating capability. Thus, the known elastic mount leaves some room for improvements in its capability for isolating vibrations in a relatively high frequency range, such as booming noise.

SUMMARY OF THE INVENTION

It is therefore an object of the present invention to provide a fluid-filled elastic mount which is capable of selectively exhibiting different vibration damping or isolating characteristics, depending upon the type of the vibrations, and which can stably exhibit high damping capability for low-frequency vibrations and significantly improved isolating capability for high-frequency vibrations.

The above object may be achieved according to the principle of the present invention, which provides a fluid-filled elastic mount for flexibly connecting two members, comprising: (a) a first support structure and a second support structure which are respectively fixed to the two members to be flexibly connected, and which are spaced apart from each other in a load-receiving direction in which vibrations are applied to the elastic mount; (b) an elastic body interposed between the first and second support structures for elastically connecting the first and second support structures, the elastic body at least partially defining a main fluid chamber filled with a viscous fluid, the main fluid chamber being formed between the first and second support structures such that the main fluid chamber is subject to the vibrations applied between the first and second support structures; (c) a flow-restricting member disposed in the main fluid chamber and cooperating with a surface defining the main fluid chamber to define a flow-restricting portion therebetween, the flow-restricting portion having a dimension between the flow-restricting member and the surface, which dimension is determined so that, upon application of said vibrations, shearing stresses are applied to a mass of the viscous fluid which exists in the flow-restricting portion; (d) means for defining an air chamber disposed adjacent to the main fluid chamber, including a partition member for separating the air chamber from the main fluid chamber such that the air chamber is disposed on one side of the partition member while the main fluid chamber is disposed on the other side, at least a portion of the partition member consisting of a flexible diaphragm, a pressure of the viscous fluid in the main fluid chamber being applied to the air chamber through the flexible diaphragm; (e) pressure control means for changing a pressure in the air chamber; (f) means for defining a variable-volume auxiliary fluid chamber filled with the viscous fluid; and (g) means for defining a fluid passage for fluid communication between the main fluid chamber and the auxiliary fluid chamber, a pressure change in the main fluid chamber due to a static load applied to the mount being absorbed by flows of the viscous fluid through the fluid passage and a volumetric change of the auxiliary fluid chamber.

In the fluid-filled elastic mount of the present invention constructed as described above, the air chamber partially defined by the partition member opposite to the main fluid chamber is substantially eliminated when the pressure control means supplies the air chamber with a pressure lower than the atmospheric pressure When the air chamber is open to the atmosphere by the pressure control means, the air chamber is given a nominal volume within the elastic mount, whereby a pressure rise in the main fluid chamber which occurs upon application of vibrations is effectively absorbed or alleviated, based on the variability of the volume of the air chamber partially defined by the flexible diaphragm. As a result, the dynamic spring constant of the elastic mount may be kept at a relatively low value even if the mount receives high-frequency vibrations. Thus, the elastic mount of the invention exhibits excellent isolating capability with respect to the high-frequency vibrations. When the air chamber is substantially eliminated by the pressure control means as described above, on the other hand, shearing stresses are effectively given to the mass of the viscous fluid which exists in the flow-restricting portion of the main fluid chamber, since the air chamber does not function to absorb the pressure change in the main fluid chamber. Thus, the present elastic mount also exhibits excellent damping capability with respect to low-frequency vibrations based on shearing strains of the viscous fluid.

In the fluid-filled elastic mount as described above, the viscous fluid is allowed to flow between the main and auxiliary fluid chambers through the fluid passage. The fluid flow effectively alleviates or absorbs a pressure rise in the main fluid chamber due to a static load such as the weight of the member supported by the elastic mount upon installation of the mount, and also accommodates a pressure drop in the main fluid chamber due to the sub-atmospheric pressure applied to the air chamber by the pressure control means. Thus, the pressure in the main fluid chamber may be maintained at a substantially constant value. Accordingly, the elastic mount is free from reduction in the volume of the air chamber due to the pressure rise in the main fluid chamber, and from large reduction of the shearing stresses given to the viscous fluid due to the lowered pressure in the main fluid chamber. Thus, the elastic mount of the invention is able to stably provide a sufficiently reduced dynamic spring constant based on the pressure absorbing function of the air chamber, and a sufficiently high vibration damping effect based on the shearing strains of the viscous fluid.

Consequently, the elastic mount according to the present invention is capable of selectively exhibiting high degrees of damping and isolating capability for low-frequency and high-frequency vibrations, respectively, by changing the pressure in the air chamber by the pressure control means depending upon the type of the vibrations applied to the mount.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
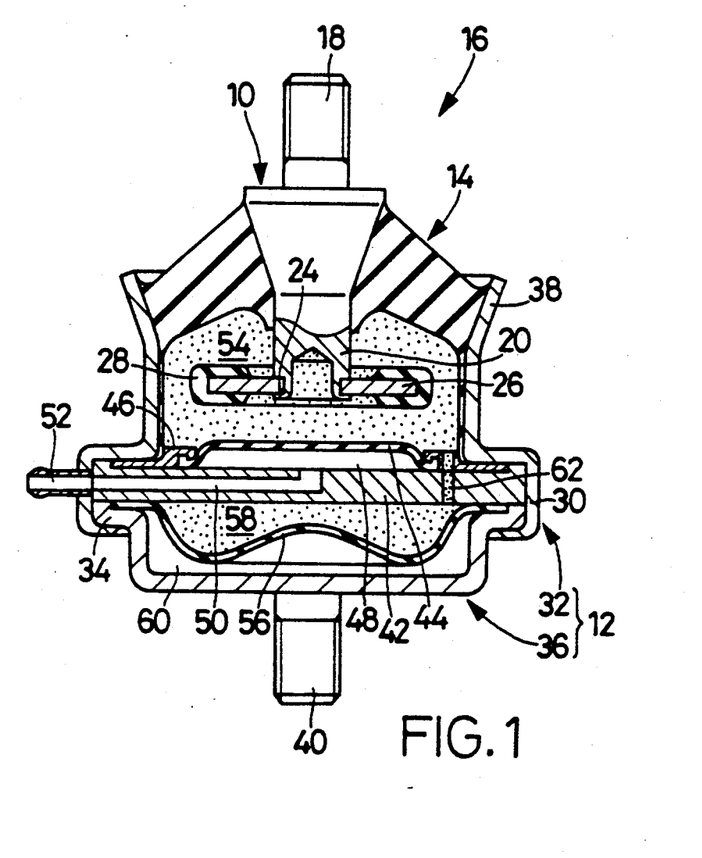
FIG. 1 is an elevational view in axial cross section of one embodiment of a fluid-filled elastic mount of the present invention in the form of an engine mount for a motor vehicle.

Referring first to FIG. 1 showing the vehicle engine mount 16 as one embodiment of the fluid-filled elastic mount of this invention, reference numerals 10 and 12 denote a first and a second rigid support structure, respectively. These first and second support structures 10, 12 are spaced apart from each other by a suitable distance in a load-receiving direction in which vibrations are received by the elastic mount. Between the first and second support structures 10, 12, there is formed an elastic body 14 so that the two structures 10, 12 are elastically connected to each other. The elastic mount 16 is installed on a motor vehicle such that the first support structure 10 is fixed to one of an engine unit of the vehicle and a body of the vehicle while the second support structure 12 is fixed to the other. Thus, the engine unit is flexibly mounted on the vehicle body in a vibration damping or isolating manner. With the engine mount 16 thus installed on the vehicle, the weight of the engine unit acts on the engine mount 16 in a direction in which the first and second support structures 10, 12 are opposed to each other (i.e., the vertical direction as seen in FIG. 1), whereby the two support structures 10, 12 are moved toward each other by a given distance in that direction. In this condition, the engine mount 16 is adapted to receive the vibrations to be damped or isolated, in the direction of opposition of the first and second support structures 10, 12, namely, in the above-indicated load-receiving direction.

More specifically, the first support structure 10 includes a body portion having a generally truncated conical shape, and a cylindrical support 20 which is formed as an integral part of the body portion. The support 20 extends from the small-diameter end face of the body portion in the load-receiving direction, axially inwardly of the engine mount. To the large-diameter end face of the body portion of the first support structure 10, there is secured a first mounting bolt 18 which extends axially outwardly of the mount. Thus, the first support structure 10 is fixedly attached to the engine unit or the vehicle body, through the first mounting bolt 18.

The cylindrical support 20 of the first support structure 10 is formed integrally with a thin-walled, cylindrical caulked portion 24, which extends coaxially with the support 20 from one of the opposite axial ends of the support 20 remote from the body portion. A flow-restricting member in the form of a generally annular plate 26 is fitted on the caulked portion 24, and fixed in position by caulking the portion 24 against the annular plate 26. Thus, the annular plate 26 is fixedly attached to the first support structure 10, such that the plate 26 radially extends in a plane perpendicular to the load-receiving direction. The outer peripheral portion of the annular plate 26 is covered with a rubber layer 28, which is bonded thereto by means of vulcanization.

On the other hand, the second support structure 12 consists of a generally cylindrical member 32 having a caulked portion 30 formed at one axial open end thereof remote from the first support structure 10, and a generally dish-like bottom member 36 with an outward flange 34 formed on its outer periphery adjacent the cylindrical member 32. With the caulked portion 30 caulked against the outward flange 34, one of the axially opposite openings of the cylindrical member 32 is fluid-tightly closed by the bottom member 36, to provide a generally cup-shaped structure as the second support structure 12.

The cylindrical member 32 further has a tapered portion 38 formed at the other axial open end thereof remote from the bottom member 36. The diameter of the tapered portion 38 gradually increases toward the opening of the second support structure 12. The bottom member 36 has a second mounting bolt 40 which extends from the outer surface of the bottom portion in the load-receiving direction, axially outwardly of the engine mount 16. The second support structure 12 is fixedly attached to the vehicle body or the engine unit, through the second mounting bolt 40.

The first and second support structures 10, 12 are positioned concentrically or coaxially with each other, such that the cup-shaped second support structure 12 is open facing the small-diameter end face of the first support structure 10. Between these two support structures 10, 12, there is formed by vulcanization the elastic body 14, which has a generally truncated conical shape. The elastic body 14 is bonded at its small-diameter end to the outer surface of the first support structure 10 and at its large-diameter end to the inner surface of the tapered portion 38 of the cylindrical member 32 of the second support structure 12. Thus, the first and second support structures 10, 12 and the elastic body 14 are integrally assembled together such that the two support structures 10, 12 are elastically connected to each other by the elastic body 14. In this condition, the opening of the second support structure 12 is fluid-tightly closed by the first support structure 10 and the elastic body 14.

In the second support structure 12, there is disposed a disc-like metallic member 42 such that an outer peripheral portion of the disc-like member 42 is gripped by and between the caulked portion 30 of the cylindrical member 32, and the outward flange 34 of the bottom member 36. The space defined by the first and second support structures 10, 12 and the elastic body 14 is divided by the disc-like member 42 into a first enclosure on the side of the first support structure 10, and a second enclosure on the side of bottom member 36.

The first enclosure is filled with a highly viscous fluid, to provide a main fluid chamber 54 defined by the first and second support structures 10, 12, the elastic body 14 and the disc-like member 42. The cylindrical support 20 of the first support structure 10 protrudes into the main fluid chamber 54, such that the annular plate 26 fixed to the support 20 is opposed to the disc-like member 42 with a suitable spacing therebetween, while extending in a direction substantially perpendicular to the load-receiving direction.

The viscosity of the highly viscous fluid filling the main fluid chamber 54 is suitably determined depending upon a desired vibration damping characteristic of the engine mount. The highly viscous fluid has a viscosity preferably within a range of 5–500 Pa.sec, more preferably within a range of 10–200 Pa.sec. For example, silicone oil is favorably used as the highly viscous fluid.

On one of the opposite major surfaces of the disc-like member 42 on the side of the main fluid chamber 54, there is disposed a partition member in the form of a thin, disc-like first elastic diaphragm 44 made of a rubber material. The first elastic diaphragm 44 is secured in position such that an outer peripheral portion of the diaphragm 44 is fluid-tightly pressed against the disc-like member 42, by an annular retainer member 46 which is gripped by and between the caulked portion 30 of the cylindrical member 32 and the disc-like member 42. Between the first elastic diaphragm 44 and the disc-like member 42, there is formed an air chamber 48 which is fluid-tightly enclosed, and is separated from the main fluid chamber 54 by the elastic diaphragm 44. In this arrangement, the pressure of the viscous fluid in the fluid chamber 54 is applied to the air chamber 48 through the first elastic diaphragm 44.

The air chamber 48 is held in communication with the exterior space of the engine mount 16, through an air passage 50 formed through the disc-like member 42, and a connecting port 52 formed through the cylindrical member 32. In operation, a selected one of the atmospheric pressure and a sub-atmospheric pressure lower than the atmospheric pressure is applied to the air chamber 48, through the connecting port 52, as will be described in detail later.

In the above-indicated second enclosure defined between the bottom member 36 and the disc-like member 42, there is provided a flexible diaphragm in the form of a thin, disc-like second elastic diaphragm 56, which is gripped at its outer peripheral portion by and between the disc-like member 42 and the outward flange 34 of the bottom member 36. The second enclosure is divided into two sections by the second elastic diaphragm 56.

One of the two sections which is defined between the second elastic diaphragm 56 and the disc-like member 42 is filled with the highly viscous fluid as contained in the main fluid chamber 54. Thus, there is formed an auxiliary fluid chamber 58 whose volume is variable due to elastic deformation of the second elastic diaphragm 56. The other section defined between the second elastic diaphragm 56 and the bottom member 36 constitutes an air space 60 which allows the elastic deformation of the diaphragm 56.

The disc-like member 42 disposed between the main and auxiliary fluid chambers 54, 58 has a fluid passage 62 formed through the thickness thereof, at a radially outer portion thereof which is not covered by the first elastic diaphragm 44. The highly viscous fluid is allowed to flow between the main and auxiliary fluid chambers 54, 58, through the fluid passage 62. In this arrangement, a pressure change in the main fluid chamber 54 is absorbed or alleviated by the fluid flow through the fluid passage 62, based on a volumetric change of the variable-volume auxiliary fluid chamber 58.

Figure 2:
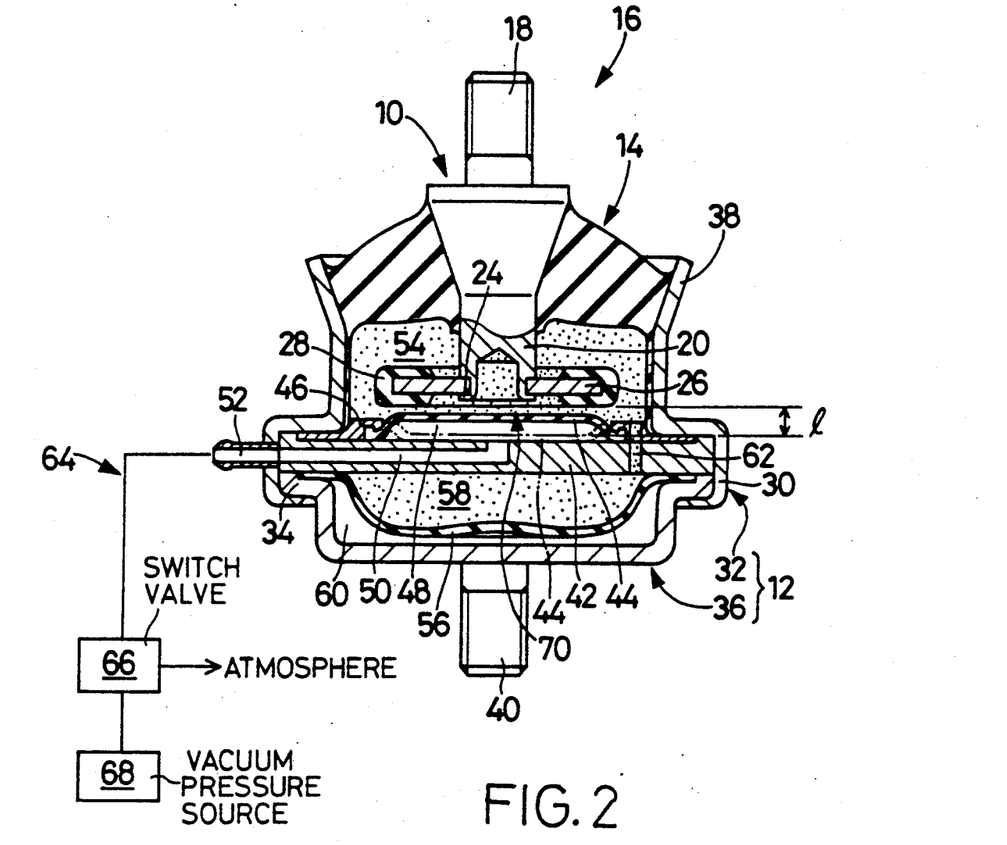
FIG. 2 is an elevational view in axial cross section of the engine mount of FIG. 1, when installed in place on the motor vehicle.

When the thus constructed engine mount 16 is installed between the engine unit and the vehicle body as described above, a part of the weight or load of the engine unit is received by the first and second support structures 10, 12, whereby these two support structures 10, 12 are moved a predetermined distance toward each other, as shown in FIG. 2.

Upon installation of the engine mount 16 on the vehicle, an air conduit 64 is connected to the connecting port 52 indicated above, so that the air chamber 48 communicates with a selected one of the atmosphere and a vacuum pressure source 68, through the air passage 50, connecting port 52, air conduit 64 and switch means in the form of a switch valve 66. The vacuum pressure source 68 provides the sub-atmospheric pressure lower than the atmospheric pressure. The switch valve 66 is selectively placed in a first position for communication of the air chamber 48 with the atmosphere (atmospheric pressure), and a second position for communication of the air chamber 48 with the vacuum pressure source 68 (sub-atmospheric pressure). In the instant embodiment, the air passage 50, connecting port 52, air conduit 64, switch valve 66 (switching means) and vacuum pressure source 68 constitute pressure control means for changing a pressure in the air chamber 48.

When the air chamber 48 is held in communication with the atmosphere with the switch valve 66 placed in the first position, a radially inner portion of the first elastic diaphragm 44 is spaced apart from the disc-like member 42 due to its elasticity, as indicated by a solid line in FIG. 2, whereby the air chamber 48 having a given volume is defined between the diaphragm 44 and the disc-like member 42. When the switch valve 66 is operated to the second position for communication of the air chamber 48 with the vacuum pressure source 68, the first elastic diaphragm 44 is sucked by the sub-atmospheric pressure supplied from the pressure source 68, and is drawn onto the disc-like member 42 against the elasticity of the diaphragm 44, as indicated by a two-dot chain line in FIG. 2. Consequently, the air chamber 48 is substantially eliminated.

In the engine mount 16 constructed as described above, when the air chamber 48 is connected to the vacuum pressure source 68 and is thereby eliminated, the main fluid chamber 54 is provided with a flow-restricting portion 70 which is formed between the annular plate 26 and the first elastic member 44 drawn onto the disc-like member 42. The flow-restricting portion 70 has a dimension "l" as measured in the load-receiving direction, and extends in a direction perpendicular to the load-receiving direction, i.e., in a direction parallel to the plane of the annular plate 26. Upon application of vibrations between the first and second support structures 10, 12, the dimension "l" of the flow-restricting portion 70, i.e., the spacing between the annular plate 26 and the first elastic diaphragm 44 is varied, whereby shearing stresses are applied to the mass of the highly viscous fluid existing in the flow-restricting portion 70. Consequently, the applied applications may be effectively damped based on shearing strains of the fluid mass. As is well known in the art, the shearing stress applied to the highly viscous fluid mass is substantially proportional to the area of the flow-restriction portion 70, and is inversely proportional to the dimension "l" of the flow-restricting portion 70. Accordingly, the area and dimension "l" of the flow-restricting portion 70 are suitably determined or adjusted, depending upon a desired vibration damping characteristic of the engine mount 16 and the viscosity of the highly viscous fluid, for example.

In the instant engine mount 16, the main fluid chamber 54 is held in fluid communication with the auxiliary fluid chamber 58, through the fluid passage 62. Accordingly, even when the pressure in the main fluid chamber 54 is reduced with the air chamber 48 being eliminated due to sucking by the vacuum pressure source 68, such a reduced pressure is effectively alleviated or eliminated due to the fluid flow from the auxiliary fluid chamber 58 to the main fluid chamber 54. Consequently, the highly viscous fluid masses in the main fluid chamber 54 can provide sufficient shearing strains upon application of vibrations, without suffering from the reduced pressure in the fluid chamber 54. Thus, the instant engine mount 16 stably exhibits excellent vibration damping capability, based on the shearing strains of the highly viscous fluid.

If the fluid passage 62 has excessively low resistance to flow of fluid therethrough, the highly viscous fluid undesirably escapes from the main fluid chamber 54 into the auxiliary fluid chamber 58 through the fluid passage 62 when the engine mount 16 receives vibrations which should be damped based on the shearing strains of the highly viscous fluid. In this case, the engine mount 16 may not be able to provide a sufficiently high degree of damping capability based on the shearing strains of the highly viscous fluid. Accordingly, it is desirable to determine the dimensions (such as the cross sectional area and the length) of the fluid passage 62, so as to meet the following requirements: 1) the fluid passage 62 should permit fluid flows therethrough to eliminate a pressure rise in the main fluid chamber 54 when the engine mount 16 receives a static load of the engine unit, for example; 2) the fluid passage 62 is so highly resistant to flow of fluid therethrough as to act as if it were substantially closed, when the engine mount receives the vibrations which should be damped based on the shearing strains of the highly viscous fluid in the main fluid chamber 54.

In the engine mount 16 as described above, when the air chamber 48 is held in communication with the atmosphere so that the air chamber 48 having a given volume appears between the main fluid chamber 54 and the disc-like member 42, pressure changes in the main fluid chamber 54 as a result of relative displacement of the first and second support structures 10, 12 upon application of vibrations are absorbed or alleviated based on oscillatory displacement or deformation of the elastic diaphragm 44 which partially defines the variable-volume air chamber 48. Consequently, the engine mount 16 exhibits a sufficiently soft spring characteristic, without suffering from an excessive rise in its dynamic spring constant due to the pressure rise in the main fluid chamber 54.

In the instant engine mount 16, the fluid passage permits fluid flow between the main and auxiliary fluid chambers 54, 58. Accordingly, the pressure rise in the main fluid chamber 54 which occurs when the weight of the engine unit partially acts on the engine mount 16 can be effectively alleviated or eliminated by the fluid flow from the main fluid chamber 54 to the auxiliary fluid chamber 58 through the fluid passage 62. Consequently, the air chamber is prevented from being compressed or eliminated even when the pressure in the main fluid chamber 54 is raised due to application of the partial weight of the engine unit. Thus, the instant engine mount 16 stably provides a considerably effectively reduced dynamic spring constant based on the pressure absorbing function of the air chamber 48, irrespective of the weight of the engine unit.

The present engine mount 16 is adapted to control the switch valve 66 depending upon the running condition of the vehicle, so that the engine mount exhibits suitable vibration damping or isolating characteristics depending upon the type of vibrations applied. Described in detail, the air chamber 48 is connected to the vacuum pressure source 68 upon application of low-frequency vibrations, so that the engine mount 16 can effectively damp the applied vibrations based on the shearing strains of the highly viscous fluid contained in the main fluid chamber 54. Upon application of high-frequency vibrations, on the other hand, the air chamber 48 is open to the atmosphere so that the engine mount 16 can provide a sufficiently reduced dynamic spring constant so as to effectively isolate the applied vibrations, based on the pressure absorbing function of the air chamber 48.

Figure 3A:
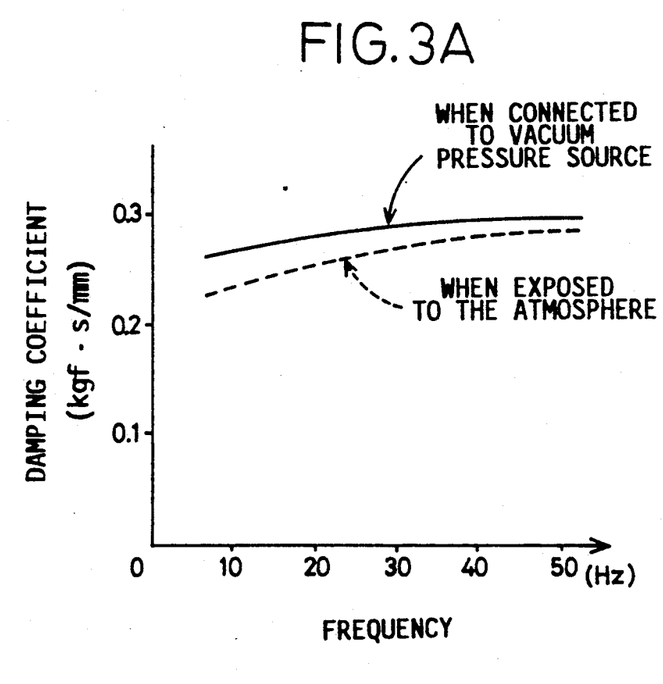
FIG. 3(A) is a graph showing the relationship between the damping coefficient of the engine mount of FIG. 1 and frequencies of vibrations applied to the mount.
Figure 3B:
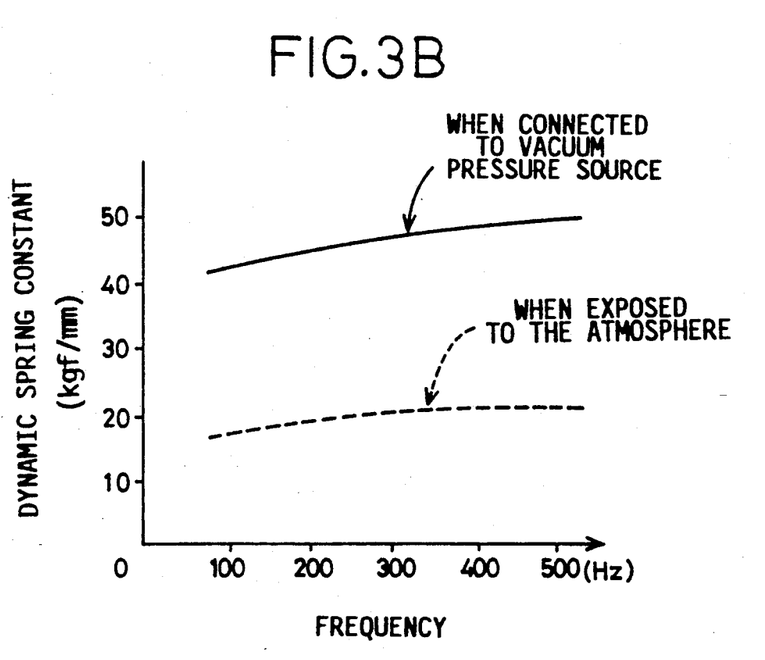
FIG. 3(B), is a graph showing the relationship between the dynamic spring constant of the engine mount of FIG. 1 and frequencies of vibrations applied to the mount.

In a test, the damping coefficient and dynamic spring constant of the present engine mount 16 were measured in relation to the frequencies of the input vibrations, when the air chamber 48 was open to the atmosphere or connected to the vacuum pressure source 68. It will be understood from the results of the measurement as shown in FIGS. 3(A) and 3(B) that the engine mount 16 of the present embodiment is capable of providing a high vibration damping characteristic and a sufficiently low dynamic spring constant, by selectively connecting the air chamber 48 to the appropriate one of the atmosphere and the vacuum pressure source 68.

In the engine mount 16 constructed as described above, the static spring constant of the mount may also be changed or adjusted by controlling the pressure in the air chamber 48. Therefore, when the engine mount 16 is required to provide a high static spring constant so as to prevent oscillations of the engine unit when the vehicle speed is rapidly increased or decreased, for example, the air chamber 48 is connected to the vacuum pressure source 68 so that the mount 16 has a sufficiently high static spring constant.

In the instant embodiment, the annular plate 26 fixed to the first support structure 10 is spaced suitable distances from the disc-like member 42 and the cylindrical member 32 of the second support structure 12, in the load-receiving direction and the direction perpendicular to the load-receiving direction, respectively. Accordingly, when the engine mount 16 receives a considerably large vibrational load, the annular plate 26 may abut on the disc-like member 42 or the cylindrical member 32 through the rubber layer 28, so as to limit the amount of relative displacement between the first and second support structures 10, 12.

While the present invention has been described in its presently preferred embodiment with a certain degree of particularity, for illustrative purpose only, it is to be understood that the invention is not limited to the details of the illustrated embodiment, but may be embodied otherwise.

While the first elastic diaphragm 44 made of a rubber material is used as a partition member for separating the main fluid chamber and the air chamber from each other in the illustrated embodiment, the elastic diaphragm 44 may be replaced by an inelastic, fluid-impermeable flexible diaphragm. It is also possible to form only a portion of the partition member from an inelastic flexible diaphragm.

While the air chamber is selectively connected to the atmosphere or the vacuum pressure source so that the pressure in the air chamber is changed in the illustrated embodiment, the atmosphere may be replaced by another pressure source for supplying a pressure higher than the atmospheric pressure to the air chamber.

Further, the air chamber is not necessarily formed so as to face the flow-restricting member as in the illustrated embodiment. Rather, the air chamber may be formed in any position adjacent to the main fluid chamber.

Moreover, the construction of the flow-restricting portion of the main fluid chamber is not limited to that of the illustrated embodiment, but may be suitably modified provided that the flow-restricting portion effectively gives shearing stresses to the highly viscous fluid mass upon application of vibrations. For example, a block serving as a flow-restricting member may be disposed in the main fluid chamber, so as to cooperate with the inner wall surface of the main fluid chamber to form a flow-restricting portion therebetween.

The construction of the fluid passage communicating with the main and auxiliary fluid chambers, and the positions where the fluid passage is open to the respective fluid chambers are not limited to those of the illustrated embodiment.

While the illustrated embodiment of the invention is used as an engine mount for an automotive vehicle, the principle of the present invention is equally applicable to any fluid-filled elastic mounts other than the engine mount, for example, to a vehicle body mount and a differential gear mount, and even applicable to fluid-filled vibration damping/isolating components used for various devices or equipment other than those for automotive vehicles.

It is to be understood that the present invention may be embodied with various other changes, modifications and improvements, which may occur to those skilled in the art, without departing from the scope of the invention defined in the following claims.

What is claimed is:

1. A fluid-filled elastic mount for flexibly connecting two members, comprising:

a first support structure and a second support structure which are respectively fixed to the two members to be flexibly connected, and which are spaced apart from each other in a load-receiving direction in which vibrations are applied to the elastic mount;

an elastic body interposed between said first and second support structures for elastically connecting the first and second support structures, said elastic body at least partially defining a main fluid chamber filled with a viscous fluid, said main fluid chamber being formed between said first and second support structures such that said main fluid chamber is subject to said vibrations applied between the first and second support structures;

a flow-restricting member disposed in said main fluid chamber and cooperating with a surface defining said main fluid chamber to define a flow-restricting portion therebetween, said flow-restricting portion having a dimension between said flow-restricting member and said surface, which dimension is determined so that, upon application of said vibrations, shearing stresses are applied to a mass of said viscous fluid which exists in said flow-restricting portion;

means for defining an air chamber disposed adjacent to said main fluid chamber, including a partition member for separating said air chamber from said main fluid chamber such that said air chamber is disposed on one side of said partition member while said main fluid chamber is disposed on the other side, at least a portion of said partition member consisting of a flexible diaphragm, a pressure of said viscous fluid in said main fluid chamber being applied to said air chamber through said flexible diaphragm;

pressure control means for changing a pressure in said air chamber, said pressure control means comprising switching means operable between a first position and a second position, said pressure control means further comprising a vacuum pressure source for providing said air chamber with a sub-atmospheric pressure when said switching means is in said first position, said air chamber being held in communication with an atmosphere having an atmospheric pressure when said switching means is in said second position;

means for defining a variable-volume auxiliary fluid chamber filled with said viscous fluid; and means for defining a fluid passage for fluid communication between said main fluid chamber and said auxiliary fluid chamber, a pressure change in said main fluid chamber due to a static load applied to the mount being absorbed by flow of said viscous fluid through said fluid passage and a volumetric change of said auxiliary fluid chamber.

2. A fluid-filled elastic mount according to claim 1, wherein said means for defining an air chamber further comprises an air passage communicating with said air chamber, said pressure control means including an air conduit connected to said air passage for changing the pressure in said air chamber.

3. A fluid-filled elastic mount according to claim 1, wherein said flow-restricting member consists of an annular plate which is fixed at an inner circumference thereof to said first support structure, said annular plate radially extending in a plane substantially perpendicular to said load-receiving direction.

4. A fluid-filled elastic mount according to claim 3, wherein said flexible diaphragm of said partition member is opposed to one of opposite major surfaces of said annular plate, to thereby define said flow-restricting portion.

5. A fluid-filled elastic mount according to claim 1, wherein said partition member consists of an elastic diaphragm made of a rubber material.

6. A fluid-filled elastic mount according to claim 1, wherein said viscous fluid has a kinematic viscosity within a range of 5-500 Pa.sec.

7. A fluid-filled elastic mount according to claim 6, wherein said viscous fluid has a kinematic viscosity within a range of 10-200 Pa.sec.

8. A fluid-filled elastic mount according to claim 1 wherein said viscous fluid is silicone oil.

* * * * *